(12) United States Patent
Ueguri

(10) Patent No.: US 10,666,850 B2
(45) Date of Patent: May 26, 2020

(54) IMAGING CONTROL APPARATUS

(71) Applicant: CANON KABUSHIKI KAISHA, Tokyo (JP)

(72) Inventor: Toshiaki Ueguri, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/162,872

(22) Filed: Oct. 17, 2018

(65) Prior Publication Data

US 2019/0124255 A1   Apr. 25, 2019

(30) Foreign Application Priority Data

Oct. 20, 2017   (JP) ................ 2017-204170

(51) Int. Cl.
*H04N 5/232* (2006.01)
*H04N 5/91* (2006.01)
*H04N 5/77* (2006.01)

(52) U.S. Cl.
CPC .......... *H04N 5/23212* (2013.01); *H04N 5/77* (2013.01); *H04N 5/91* (2013.01)

(58) Field of Classification Search
CPC ........ H04N 5/23212; H04N 5/77; H04N 5/91; H04N 5/23245; H04N 5/232939; H04N 5/232122; H04N 5/232; H04N 5/23216
See application file for complete search history.

(56) References Cited

U.S. PATENT DOCUMENTS

| 2002/0031349 A1* | 3/2002 | Hayashi | H04N 1/2112 396/429 |
|---|---|---|---|
| 2007/0192723 A1* | 8/2007 | Anzelde | G06F 9/451 715/772 |

(Continued)

FOREIGN PATENT DOCUMENTS

JP   2009302902 A   12/2009

OTHER PUBLICATIONS

Wikipedia—Sony α9, retrieved from https://en.wikipedia.org/wiki/Sony_%CE%B19 on Nov. 24, 2019 (Year: 2019).*

(Continued)

*Primary Examiner* — Timothy J Henn
(74) *Attorney, Agent, or Firm* — Rossi, Kimms & McDowell LLP

(57) ABSTRACT

An imaging control apparatus includes: an imaging control unit configured to perform control so that continuous shooting in which a plurality of images are continuously shot is performed; a temporary storage unit configured to temporarily store image data acquired by the continuous shooting into a first memory; a recording unit configured to record the image data stored in the first memory into a second memory; a setting unit configured to set a predetermined shooting setting relating to the continuous shooting; and a display control unit configured to perform control so that information indicating a storage state of data in the first memory is displayed in the continuous shooting, wherein the display control unit performs control so that an indication relating to the storage state of the data in the first memory in accordance with the predetermined shooting setting is displayed together with the information.

10 Claims, 11 Drawing Sheets

(56) References Cited

U.S. PATENT DOCUMENTS

| | | | | |
|---|---|---|---|---|
| 2007/0286030 | A1* | 12/2007 | Brech | G04F 1/005 368/89 |
| 2008/0055429 | A1* | 3/2008 | Yoshida | H04N 5/2628 348/240.99 |
| 2008/0244437 | A1* | 10/2008 | Fischer | G16H 40/40 715/772 |
| 2013/0176458 | A1* | 7/2013 | Van Dalen | H04N 5/232 348/231.99 |
| 2015/0046301 | A1* | 2/2015 | Wuerch | G06Q 40/12 705/30 |
| 2018/0139407 | A1* | 5/2018 | Togita | H04N 5/23245 |
| 2019/0320121 | A1* | 10/2019 | Takahashi | H04N 5/2353 |

OTHER PUBLICATIONS

Sony α9 Help Guide (2017) (Year: 2017).*
Brian Smith, Download the Sony A9 Manual, May 25, 2017, retrieved from https://briansmith.com/download-link-sony-a9-manual/ on Dec. 8, 2019 (Year: 2017).*
Brian smith, Download the Sony A9 Manual page source, May 2017, 2015, retrieved from https://briansmith.com/download-link-sony-a9-manual/ on Dec. 5, 2019 (Year: 2017).*

\* cited by examiner

FIG. 4A

| CONTINUOUS SHOOTING SETTINGS | |
|---|---|
| CONTINUOUS SHOOTING TIME | AUTO |
| | ONE SECOND |
| | TWO SECONDS |
| | THREE SECONDS |
| | FOUR SECONDS |
| | FIVE SECONDS |
| | SIX SECONDS |

FIG. 4B

| CONTINUOUS SHOOTING SETTINGS | |
|---|---|
| CONTINUOUS SHOOTING TIME | THREE SECONDS |
| STANDBY TIME | AUTO |
| | ONE SECOND |
| | TWO SECONDS |
| | THREE SECONDS |
| | FOUR SECONDS |
| | FIVE SECONDS |

FIG. 4C

| CONTINUOUS SHOOTING SETTINGS | |
|---|---|
| CONTINUOUS SHOOTING TIME | FIVE SECONDS |
| STANDBY TIME | FOUR SECONDS |
| FIVE SECONDS OF CONTINUOUS SHOOTING CAN BE PERFORMED UP TO TEN TIMES. — 401 | |

FIG. 4D

| CONTINUOUS SHOOTING SETTINGS | |
|---|---|
| CONTINUOUS SHOOTING TIME | THREE SECONDS |
| STANDBY TIME | AUTO |
| THREE SECONDS × TEN TIMES OF CONTINUOUS SHOOTING TAKE INTERVALS OF AT LEAST THREE SECONDS. — 402 | ONE SECOND |
| | TWO SECONDS |
| | THREE SECONDS |
| | FOUR SECONDS |
| | FIVE SECONDS |

FIG. 4E

| CONTINUOUS SHOOTING SETTINGS | |
|---|---|
| STANDBY TIME | TWO SECONDS |
| CONTINUOUS SHOOTING TIME | ONE SECOND |
| TWO-SECOND INTERVALS TEN TIMES OF CONTINUOUS SHOOTING CONTINUOUS SHOOTING CAN BE PERFORMED UP TO THREE SECONDS. — 403 | TWO SECONDS |
| | THREE SECONDS |
| | FOUR SECONDS |
| | FIVE SECONDS |
| | SIX SECONDS |

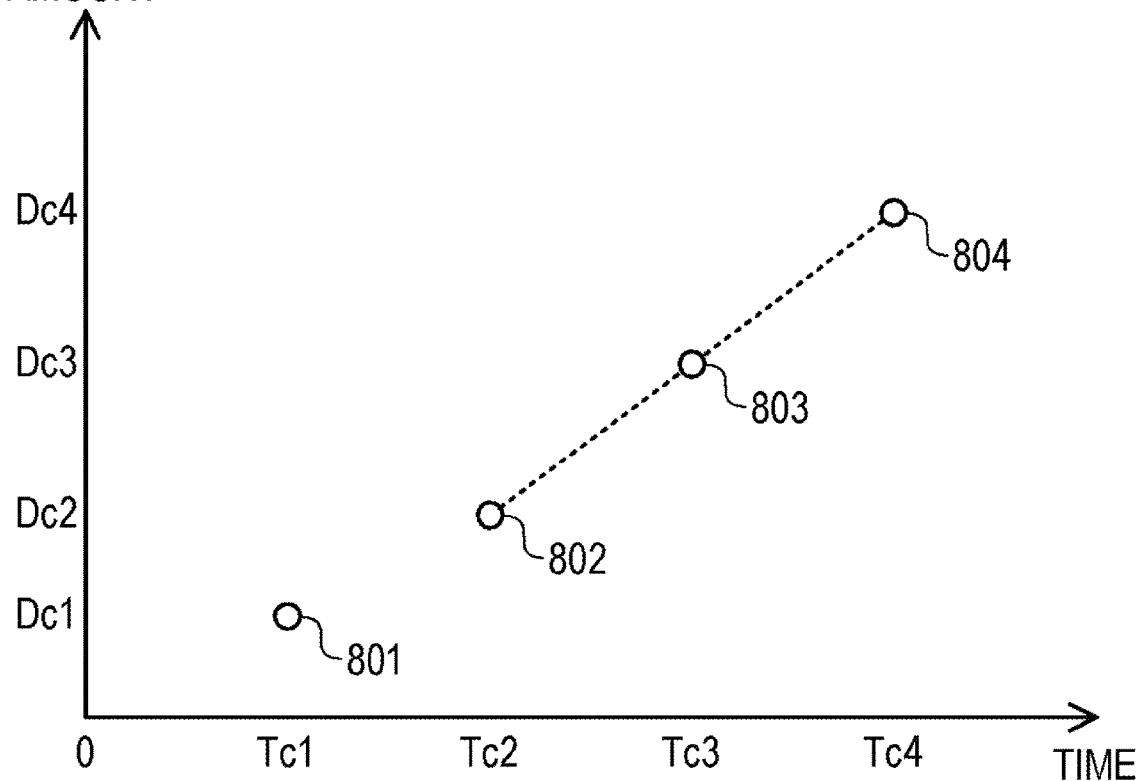

IMAGING CONTROL APPARATUS

BACKGROUND OF THE INVENTION

Field of the Invention

The present invention relates to an imaging control apparatus capable of controlling display relating to recording.

Description of the Related Art

There has been a method for calculating the number of possible shots with respect to the free space in a memory when continuous shooting is performed. In a feature described in Japanese Unexamined Patent Application Publication No. 2009-302902, the number of possible shots is calculated on the basis of the free space in a memory card when continuous shooting is performed, and the continuous shooting is ended when the number of possible shots is less than one.

SUMMARY OF THE INVENTION

In recent years, continuous shooting speed is becoming faster. Therefore, recording data is temporarily recorded into a volatile buffer and then recorded into a nonvolatile memory from the buffer when continuous shooting is performed. In a feature described in Japanese Unexamined Patent Application Publication No. 2009-302902, the number of possible shots is determined on the basis of the capacity of a memory card, and hence continuous shooting cannot be continuously performed when there is no free space in the capacity of the buffer even if there is free space in the memory card. In particular, when continuous shooting cannot be performed because there is no free space in the buffer, a user needs to wait for a while before shooting, and hence there is a fear that continuous shooting cannot be performed at a suitable timing.

Therefore, the present invention provides an imaging control apparatus that enables a user to perform continuous shooting at a more suitable timing.

An imaging control apparatus according to the present invention, includes: an imaging control unit configured to perform control so that continuous shooting in which a plurality of images are continuously shot is performed; a temporary storage unit configured to temporarily store image data acquired by the continuous shooting into a first memory; a recording unit configured to record the image data stored in the first memory into a second memory; a setting unit configured to set a predetermined shooting setting relating to the continuous shooting; and a display control unit configured to perform control so that information indicating a storage state of data in the first memory is displayed on a display unit in the continuous shooting, wherein the display control unit performs control so that an indication relating to the storage state of the data in the first memory in accordance with the predetermined shooting setting is displayed together with the information.

According to the present invention, the user can perform continuous shooting at a more suitable timing.

Further features of the present invention will become apparent from the following description of exemplary embodiments with reference to the attached drawings.

BRIEF DESCRIPTION OF THE DRAWINGS

FIG. 4A to FIG. 4E are diagrams illustrating examples of setting screens according to this embodiment;

FIG. 8 is a diagram illustrating an example of a calculation method of the buffer usage amount according to this embodiment.

DESCRIPTION OF THE EMBODIMENTS

Figure 1A:
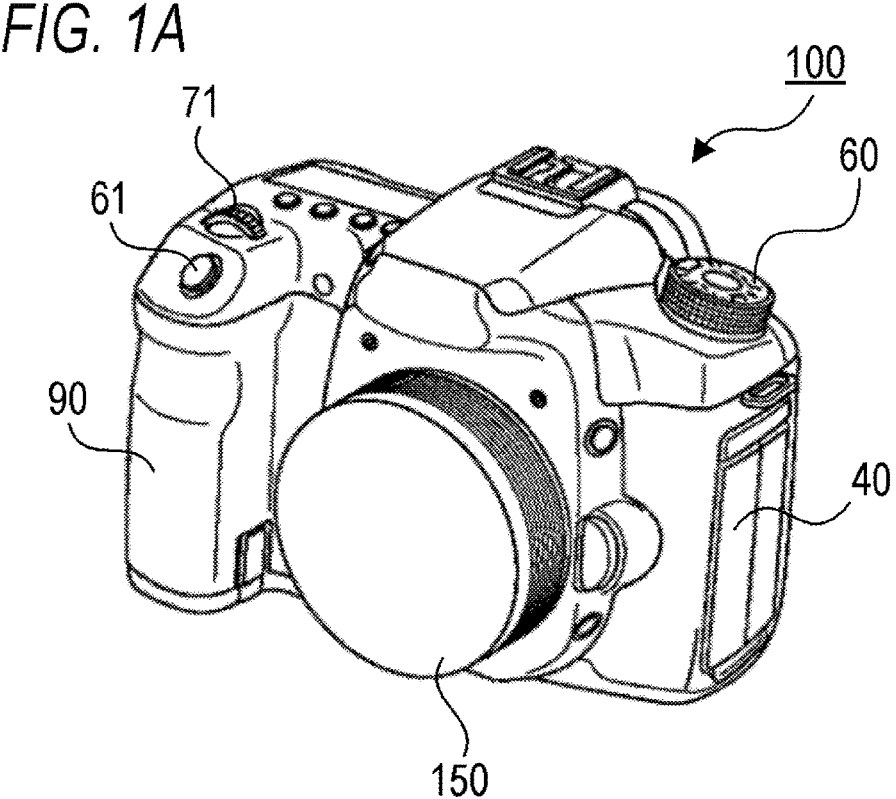
FIG. 1A and FIG. 1B are external views of a digital camera in which an embodiment of the present invention is applicable.
Figure 1B:
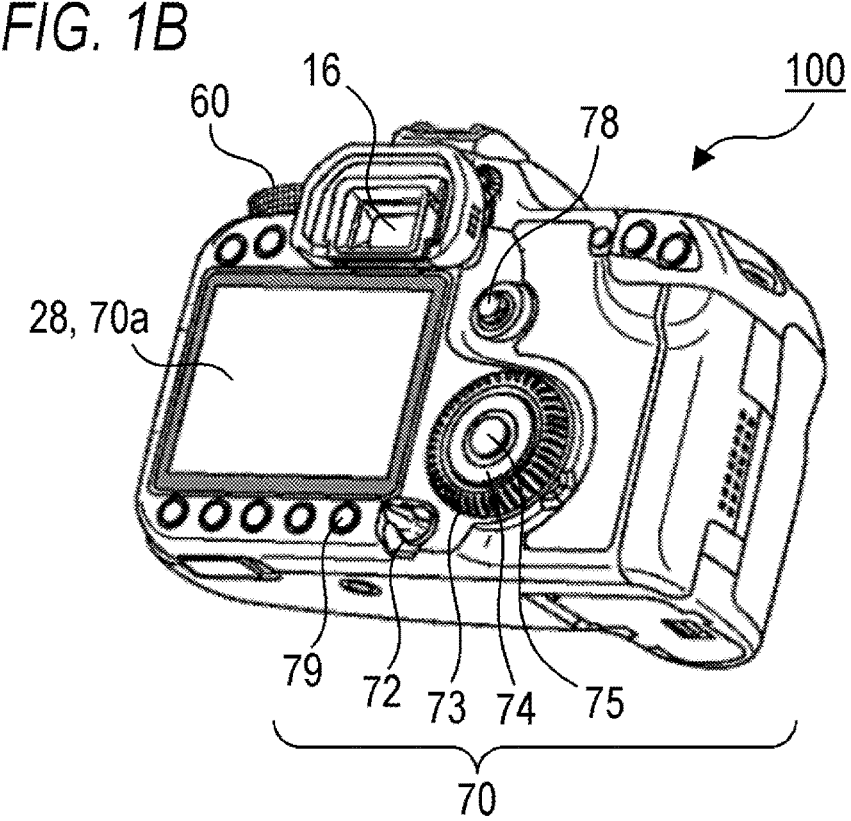

Exemplary embodiments of the present invention are described below with reference to the drawings. FIG. 1A and FIG. 1B illustrate external views of a digital camera as an example of an imaging apparatus in which the present invention is applicable. FIG. 1A is a front perspective view of a digital camera 100 and FIG. 1B is a rear perspective view of the digital camera 100.

A display unit 28 displays images, various information, shooting states of the digital camera 100, and the like. A touch panel 70a capable of detecting touch operation is integrally provided in the display unit 28. A shutter button 61 is an operation unit for issuing a shooting instruction. A mode selector switch 60 is an operation unit for switching various modes. A terminal cover 40 is a cover that protects a connector (not shown) such as a connection cable that connects an external apparatus and the digital camera 100 with each other. A main electronic dial 71 is a rotation operation member, and set values of a shutter speed, a diaphragm, and the like can be changed, for example, by rotating the main electronic dial 71. A power switch 72 is an operation member that switches a power source of the digital camera 100 between ON and OFF. A sub electronic dial 73 is a rotation operation member that moves a selection frame and feeds the images, for example A four-direction key 74 is formed so that an upper portion, a lower portion, a left portion, and a right portion can be pushed down. Operation can be performed in correspondence to the pushed portion of the four-direction key 74. A SET button 75 is a push button mainly used in the determination of a selected item, for example. A LV button 78 is a button that switches a live view (hereinafter referred to as "LV") between ON and OFF. In a video shooting mode, the LV button 78 is used in the instruction of the starting and the stopping of the video shooting (recording). A playback button 79 is an operation button that switches a mode between a shooting mode and a playback mode. By pressing down the playback button 79 during the shooting mode, the mode shifts to the playback mode and the latest image out of the images recorded in a recording medium can be displayed on the display unit 28. The main electronic dial 71, the sub electronic dial 73, the four-direction key 74, the SET button 75, the LV button 78, and the playback button 79 are included in an operation unit 70. An eyepiece viewfinder 16 is a peeking-type viewfinder for checking a focal point or a composition of an optical image of an object acquired through a lens unit 150. A grip part 90 is a holding part having a shape that can be easily gripped by a right hand when the user (photographer) holds the digital camera 100.

Figure 2:
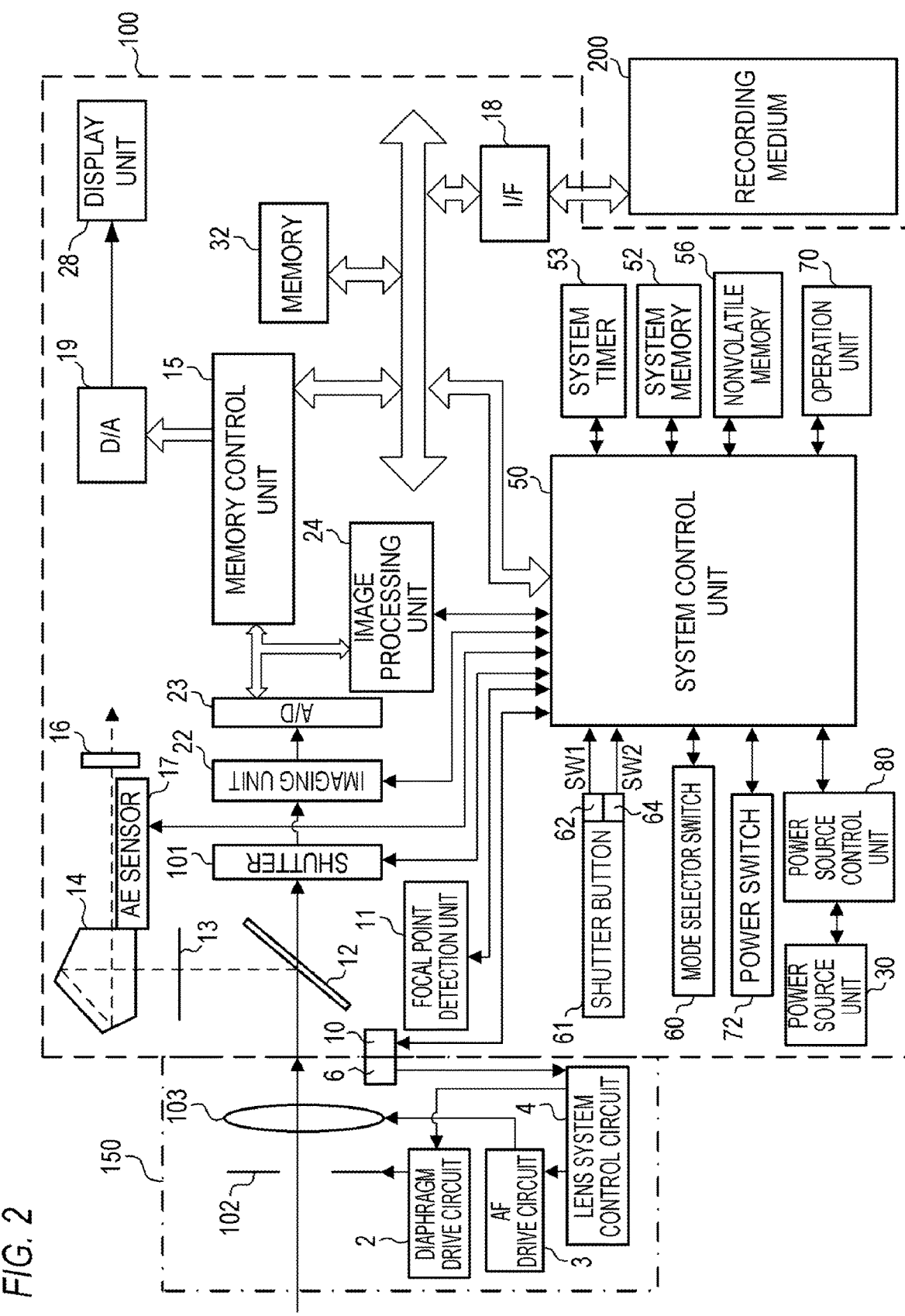
FIG. 2 is a block diagram illustrating a configuration example of the digital camera in which this embodiment is applicable.

FIG. 2 is a block diagram illustrating a configuration example of the digital camera 100. The lens unit 150 is a lens unit in which an interchangeable photographic lens is mounted. A lens 103 is generally configured by a plurality of lenses. However, the lens 103 is simplified and only one lens is illustrated here. A communication terminal 6 is a communication terminal for the lens unit 150 to communicate with the digital camera 100 side, and a communication terminal 10 is a communication terminal for the digital camera 100 to communicate with the lens unit 150 side (mountable and removable). The lens unit 150 communicates with a system control unit 50 via the communication terminals 6 and 10. In addition, the lens unit 150 performs focusing by controlling a diaphragm 102 by an internal lens system control circuit 4 via a diaphragm drive circuit 2 and displacing the position of the lens 103 via an AF (auto focus) drive circuit 3.

An AE sensor 17 measures the brightness of the object (object light) imaged on a focusing screen 13 (focusing plate) through the lens unit 150 and a quick return mirror 12.

A focal point detection unit 11 is a phase-difference-detection-type AF sensor that images an image (the optical image of the object) entering the focal point detection unit 11 via the quick return mirror 12 and outputs defocus amount information to the system control unit 50. The system control unit 50 controls the lens unit 150 on the basis of the defocus amount information and performs phase difference AF. The AF method does not necessarily need to be the phase difference AF and may be contrast AF. The phase difference AF may be performed on the basis of the defocus amount detected on an image surface of an imaging unit 22 (image surface phase difference AF) without using the focal point detection unit 11.

The quick return mirror 12 (hereinafter referred to as "mirror 12") is instructed by the system control unit 50 to be locked up and down by an actuator (not shown) when exposure, live view shooting, or video shooting is performed. The mirror 12 is locked up and down in order to switch the direction of the incident light beam from the lens 103 between the direction to the viewfinder 16 side and the direction to the imaging unit 22 side. In a normal state, the mirror 12 is provided so as to guide (reflect) the light beam to the viewfinder 16. When shooting or live view display is performed, the mirror 12 is turned upward so as to guide the light beam to the imaging unit 22 and retracts from the light beam (mirror up). The mirror 12 is a half mirror so that a center portion thereof transmits a part of the light, and a part of the light beam is transmitted so as to enter the focal point detection unit 11 for performing focal point detection.

The photographer can check the focal point state and the composition of the optical image of the object acquired through the lens unit 150 by observing the focusing screen 13 via a pentaprism 14 and the viewfinder 16.

A focal plane shutter 101 controls the exposure time of the imaging unit 22 under the control of the system control unit 50. The imaging unit 22 is an imaging element formed by a CCD element, a CMOS element, or the like that converts an optical image into an electrical signal. An A/D converter 23 is used for converting an analog signal output from the imaging unit 22 into a digital signal.

An image processing unit 24 performs resize processing such as predetermined pixel interpolation and reduction and color conversion processing on data from the A/D converter 23 or data from a memory control unit 15. In the image processing unit 24, predetermined computing processing is performed with use of the imaged image data, and the system control unit 50 performs exposure control and distance measurement control on the basis of the acquired computing result. As a result, TTL (through the lens) type AF (auto focus) processing, AE (automatic exposure) processing, and EF (pre-flash) processing are performed. In the image processing unit 24, predetermined computing processing is further performed with use of the imaged image data, and TTL-type AWB (auto white balance) processing is performed on the basis of the acquired computing result.

The data output from the A/D converter 23 is directly written into a memory 32 via the image processing unit 24 and the memory control unit 15 or via the memory control unit 15. The memory 32 stores therein image data acquired by the imaging unit 22 and converted into digital data by the A/D converter 23 and image data to be displayed on the display unit 28. The memory 32 is a volatile memory and has a storage capacity sufficient to store a predetermined number of still images and predetermined time of movies and sounds. Image data can be rapidly written into the memory 32 (buffer), but the capacity of the memory 32 is limited. The user can save a large amount of image data by performing recording control in which image data is temporarily written into the memory 32 and then written into a recording medium 200 from the memory 32. The processing of writing the image data into the recording medium 200 from the memory 32 requires time, and hence recording (writing of image data) cannot be temporarily performed when the memory 32 is filled up with data while the image data is written into the recording medium 200 from the memory 32. This state is called buffer full. Recording becomes possible again when the buffer full is resolved.

The memory 32 also serves as a memory (video memory) for image display. A D/A converter 19 converts the data for image display stored in the memory 32 into an analog signal and supplies the analog signal to the display unit 28. As described above, the image data for display written into the memory 32 is displayed by the display unit 28 via the D/A converter 19. The display unit 28 performs display according to the analog signal from the D/A converter 19 on a display such as an LCD. A function of an electronic view finder can be realized and through image display (live view display) can be performed by performing D/A conversion by the D/A converter 19 on the digital signal, on which A/D conversion has once been performed by the A/D converter 23 and which has been accumulated in the memory 32, and successively transmitting and displaying the signal to and on the display unit 28. The memory 32 does not necessarily need to serve as a video memory and may be a dedicated buffer used in the recording of the image data obtained by shooting. The video memory may be separately provided.

A nonvolatile memory 56 is a memory that can be electrically erased and recorded by the system control unit 50, and an EEPROM is used, for example. A constant, a program, and the like for the operation of the system control unit 50 are recorded in the nonvolatile memory 56. The expression of "program" herein means a program for executing various flowcharts described below in this embodiment.

The system control unit 50 has at least one processor built therein and controls the entire digital camera 100. The system control unit 50 realizes the processing of this embodiment described below by executing the program recorded in the nonvolatile memory 56 described above. A system memory 52 is a RAM. A constant, a variable, a program read out from the nonvolatile memory 56, and the like for the operation of the system control unit 50 are extracted in the system memory 52. The system control unit 50 also performs display control by controlling the memory 32, the D/A converter 19, the display unit 28, and the like.

A system timer 53 is a clocking unit that measures the time used in various control and the time of a built-in clock.

The mode selector switch 60, the shutter button 61 (a first shutter switch 62 and a second shutter switch 64), and the operation unit 70 are operation unit for inputting various operation instructions into the system control unit 50. The mode selector switch 60 switches the operation mode of the system control unit 50 to one of a still image recording mode, the video shooting mode, the playback mode, and the like. The still image recording mode includes an auto shooting mode, an auto scene determination mode, a manual mode, a diaphragm priority mode (Av mode), and a shutter speed priority mode (Tv mode). In addition, still image recording mode includes a various scene mode in which a shooting setting is selected depending on the shooting scene, a program AE mode, a custom mode, and the like. The mode is directly switched to those modes included in a menu screen by the mode selector switch 60. Alternatively, the mode may be switched to one of those modes included in the menu screen with use of other operation members after temporarily switching the screen to the menu screen by the mode selector switch 60. Similarly, the video shooting mode may include a plurality of modes.

The first shutter switch 62 is turned ON in the middle of the operation of the shutter button 61 provided on the digital camera 100, that is, by a so-called half push (shooting preparation instruction) and generates a first shutter switch signal SW1. The operation of the AF (auto focus) processing, the AE (automatic exposure) processing, the AWB (auto white balance) processing, the EF (pre-flash) processing, and the like is started by the first shutter switch signal SW1.

The second shutter switch 64 is turned ON by completing the operation of the shutter button 61, that is, by a so-called full push (shooting instruction) and generates a second shutter switch signal SW2. The system control unit 50 starts the operation of a series of shooting processing from the read out of a signal from the imaging unit 22 to the writing of the image data on the recording medium 200 by the second shutter switch signal SW2.

The operation unit 70 includes various operation members serving as input units that receive operations from the user. The operation unit 70 includes at least the main electronic dial 71, the sub electronic dial 73, the four-direction key 74, the SET button 75, the LV button 78, and the playback button 79. By selecting and operating various function icons displayed on the display unit 28, the operation members of the operation unit 70 are assigned with functions, as appropriate, depending on the scene and, function as various function buttons. The function buttons include an end button, a return button, an image feed button, a jump button, a narrow down button, and an attribute change button, for example. For example, various settable menu screens are displayed on the display unit 28 when the menu button is pressed. The user can intuitively set various settings with use of the menu screen displayed on the display unit 28, a four-direction button, and the SET button 75.

A power source control unit 80 is formed by a battery detection circuit, a DC-DC converter, a switch circuit that switches a block to be energized, and the like, and detects whether a battery is mounted, the type of the battery, and the remaining battery amount. The power source control unit 80 controls the DC-DC converter on the basis of the detection result and the instruction of the system control unit 50 and supplies a necessary voltage to units including the recording medium 200 for a necessary period.

A power source unit 30 is formed by a primary battery such as an alkaline battery and a lithium battery, a secondary battery such as a NiCd battery, a NIMH battery, and a Li battery, an AC adapter, and the like. A recording medium I/F 18 is an interface with respect to the recording medium 200 such as a memory card and a hard disk. The recording medium 200 is a recording medium such as a memory card for recording the shot image, and is formed by a semiconductor memory, a magnetic disk, and the like. The power switch 72 is a switch for switching the power source of the digital camera 100 between ON and OFF.

Examples of increase and decrease of the data recorded in the memory 32 when execution and suspension of continuous shooting (repeated shooting) are repeated are described with reference to FIG. 3A to FIG. 3D. Continuous shooting is a series of shooting continuously performed at predetermined time intervals and is performed while the shutter button 61 is pressed down by a continuous press down (full push), for example.

Figure 3A:
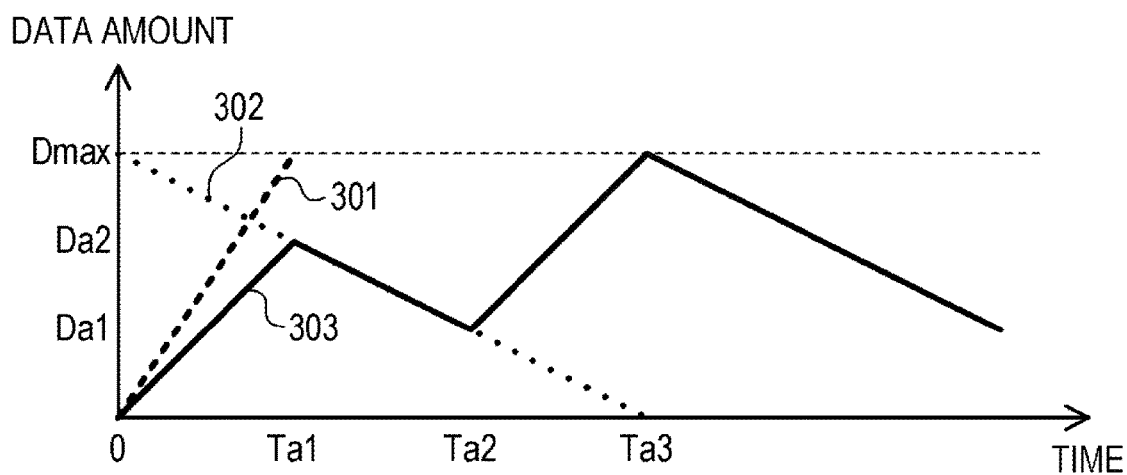
FIG. 3A and FIG. 3C are diagrams illustrating examples of increase and decrease of a buffer usage amount according to this embodiment.

In FIG. 3A, the horizontal axis indicates time and the vertical axis indicates the data amount that can be recorded in the memory 32. A data amount Dmax represents a maximum value (buffer maximum capacity) of the data amount that can be recorded in the memory 32. A straight line 301 indicates data recorded in the memory 32 by the continuous shooting. The capacity of the memory 32 is constant regardless of the number of recorded images unlike the recording medium 200. That is, even if the number of recorded images in the recording medium 200 increases, the amount of the maximum data that can be recorded in the memory 32 is unchanged from Dmax. However, when recording data is continuously recorded in the memory 32 by continuous shooting and the like, the capacity in which recording is possible may temporarily decrease from Dmax. When continuous shooting is performed for time Ta1, the data amount Dmax of data is recorded in the memory 32. A straight line 302 indicates data removed from the memory 32 by recording of data to the recording medium 200. That is, the recording data amount shot until the time Ta1 is Dmax, but only Da2 of the recording data remains in the memory 32 at the time Ta1 because the recording data shifts from the memory 32 to the recording medium 200. When the recording onto the recording medium 200 is performed for time Ta3, the data amount Dmax of data is removed from the memory 32, but the data amount of the memory 32 does not actually become zero when continuous shooting starts before the time Ta3 is reached. When the continuous shooting speed becomes higher, the amount of data recorded in the memory 32 by the continuous shooting exceeds the amount of data removed from the memory 32 by the recording onto the recording medium 200. A polygonal line 303 indicates increase and decrease of data recorded in the memory 32 when recording onto the recording medium 200 is performed while execution and suspension of the continuous shooting are repeated. The data recorded in the memory 32 increases and decreases in accordance with the increase of data due to continuous shooting and the decrease of data due to the recording onto the recording medium 200.

Figure 3B:
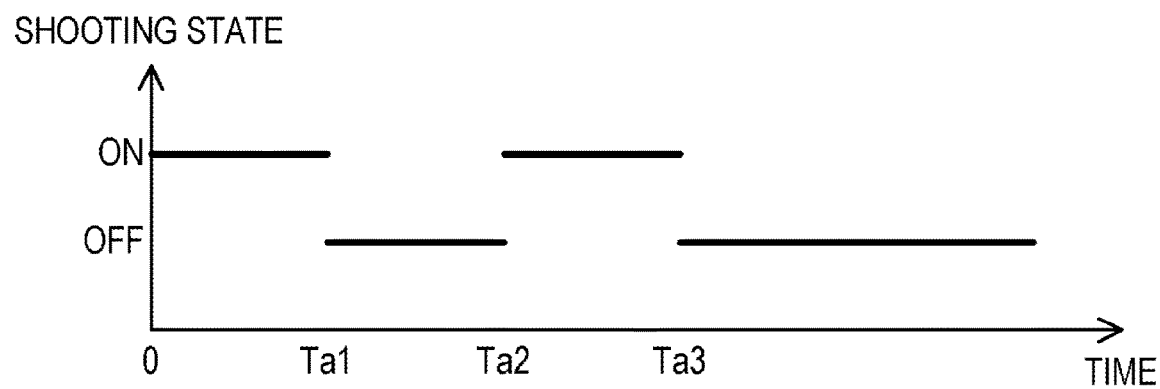
FIG. 3B and FIG. 3D are diagrams illustrating examples of temporal change in a shooting state according to this embodiment.

In FIG. 3B, the horizontal axis indicates time and the vertical axis indicates the shooting state. FIG. 3B corresponds to FIG. 3A. The shooting state ON is a state in which continuous shooting is performed and the shooting state OFF is a state in which continuous shooting is not performed. In FIG. 3B, the shooting state is repeatedly switched between the shooting state ON and the shooting state OFF. Continuous shooting is performed in a period from time 0 to the time Ta1, and hence the data amount increases to the data amount Da2 at the time Ta1. Continuous shooting is not performed in a period from the time Ta1 to time Ta2, and hence the data amount decreases to the data amount Da1 at the time Ta2. Then, continuous shooting is performed in a period from the time Ta2 to the time Ta3, and hence the data amount reaches the data amount Dmax at the time Ta3.

In FIG. 3A and FIG. 3B, a second continuous shooting is started when the recording data amount in the memory 32 reaches Da1 after first continuous shooting time (continuous time in which one continuous shooting continues; time in which the shooting state is ON). When the second continuous shooting is performed in the period (Ta2 to Ta3), the data amount reaches the data amount Dmax. When Dmax is reached, there is no space in the memory 32 (buffer full) even if recording is possible in the recording medium 200. When the data amount reaches Dmax, the next shooting cannot be performed unless the recording data is shifted to the recording medium 200 from the memory 32. The number of times of the continuous shooting is not the number of times of the shooting, but the number of times of the series of shooting performed by continuously pressing down the shutter button 61, for example. For example, a continuous shooting that is three seconds long is counted as a first continuous shooting, and a continuous shooting that is three seconds long performed again after a while is counted as a second continuous shooting.

Figure 3C:
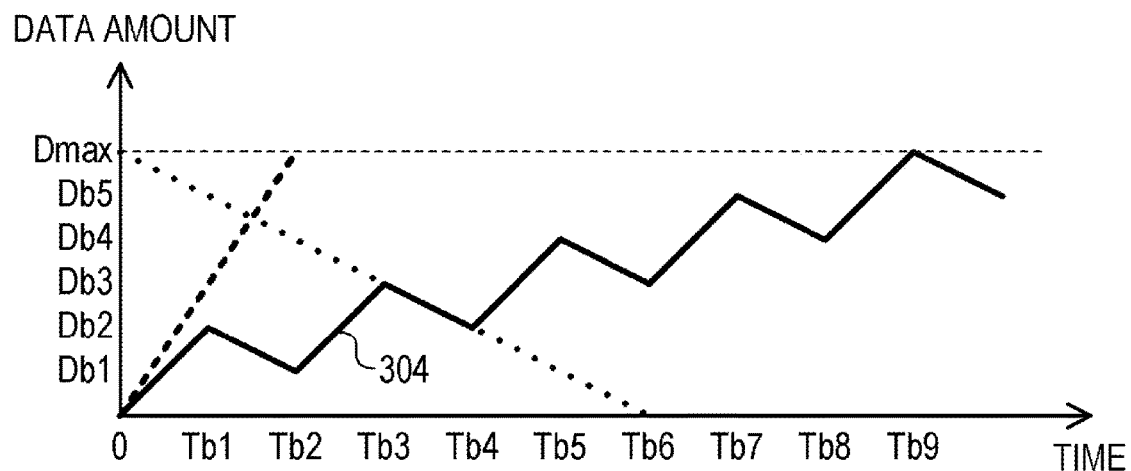
Figure 3D:
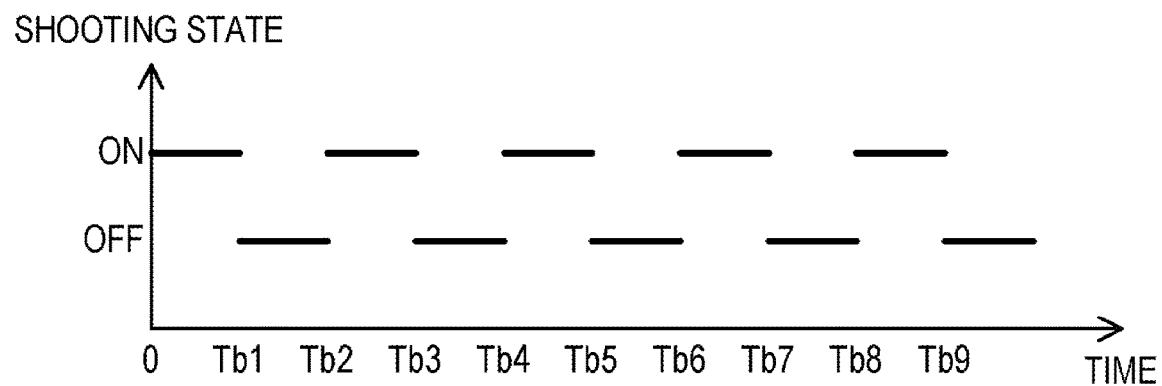

In FIG. 3C, the horizontal axis indicates time and the vertical axis indicates the data amount that can be recorded in the memory 32. A polygonal line 304 indicates increase and decrease of data recorded in the memory 32 when recording onto the recording medium 200 is performed while execution and suspension of the continuous shooting are repeated. In FIG. 3D, the horizontal axis indicates time and the vertical axis indicates the shooting state. FIG. 3D corresponds to FIG. 3C. In FIG. 3C and FIG. 3D, continuous shooting is performed in a period from time 0 to time Tb1, and hence the data amount increases to a data amount Db2 at the time Tb1. Continuous shooting is not performed in a period from the time Tb1 to time Tb2, and hence the data amount decreases to a data amount Db1 at the time Tb2. Then, continuous shooting is performed in a period from the time Tb2 to the time Tb3, and hence the data amount increases to a data amount Db3 at the time Tb3. Then, the shooting state is repeatedly switched between the shooting state ON and the shooting state OFF and the data amount reaches the data amount Dmax at time Tb9. In FIG. 3C and FIG. 3D, the continuous shooting time is relatively short and the data amount reaches the data amount Dmax by the fifth continuous shooting, and hence the continuous shooting can be repeated five times.

As described above, the continuous shooting cannot be barely repeated when the continuous shooting time is long and the continuous shooting can be repeated many times when the continuous shooting time is short. In addition, the number of times of the continuous shooting that can be performed increases when standby time (standby time between continuous shootings; time in which the shooting state is OFF) increases, and the number of times of the continuous shooting that can be performed decreases when the standby time decreases.

Therefore, in this embodiment, a suitable continuous shooting is enabled by managing the continuous shooting time and the standby time and providing a high operability to the user. For example, a case in which the continuous shooting is ended in an unintentional manner for the user is suppressed.

Settings relating to continuous shooting is described. The settings of the continuous shooting can be set with use of the menu screen (setting screen). FIG. 4A to FIG. 4E illustrate examples of screens for setting the settings of the continuous shooting. The system control unit 50 sets various settings relating to continuous shooting in accordance with the user operation using the screens in FIG. 4A to FIG. 4E. The screens in FIG. 4A to FIG. 4E are displayed on the display unit 28 by the control of the system control unit 50.

FIG. 4A illustrates a screen for setting the continuous shooting time. Time designated with use of the screen in FIG. 4A is set as the continuous shooting time. When "AUTO" is designated, the average time of a plurality of times of continuous shooting performed in the past or the time of an immediately-preceding continuous shooting is set as the continuous shooting time. The set continuous shooting time is expected time expected to be the actual continuous shooting time.

FIG. 4B illustrates a screen for setting the standby time. The standby time is set as with the continuous shooting time. The set standby time is expected time expected to be the actual standby time.

FIG. 4C illustrates a screen for giving a notification of set values of the continuous shooting time and the standby time. In the screen in FIG. 4C, a guide 401 indicating how many times the continuous shooting can be repeated in accordance with the set continuous shooting time and standby time is displayed. In the example in FIG. 4C, a continuous shooting that is five seconds long is set to be performed every four seconds, and it is indicated that the continuous shooting can be repeated up to ten times without the buffer full. As a result, the user can easily recognize the number of times the continuous shooting can be repeated and can set the continuous shooting time and the standby time with high precision. For example, the continuous shooting time can be decreased or the standby time can be increased in order to increase the number of times of the continuous shooting to a desired number of times.

FIG. 4D illustrates a screen for setting the standby time. The screen in FIG. 4D is displayed when the number of times of the continuous shooting is set in advance. In the screen in FIG. 4D, a guide 402 indicating the standby time with which a set number of times of the continuous shooting can be repeated is displayed. In the screen in FIG. 4D, items of the standby time with which a set number of times of the continuous shooting can be repeated and other items are displayed in a distinguishable manner. In the example of FIG. 4D, the guide 402 indicates that standby time that is at least three seconds long is necessary in order to repeat a continuous shooting that is three seconds long ten times. Items of "three seconds", "four seconds", and "five seconds" are displayed in a color different from that of the other items. As a result, the user can easily recognize the standby time for repeating the set number of times of the continuous shooting and can set the number of times of the continuous shooting, the continuous shooting time, and the standby time with high precision. For example, the number of times of the continuous shooting can be decreased or the continuous shooting time can be decreased in order to decrease the standby time to the desired time.

FIG. 4E illustrates a screen for setting the continuous shooting time. The screen in FIG. 4E is displayed when the number of times of the continuous shooting is set in advance. In the screen in FIG. 4E, a guide 403 indicating the continuous shooting time with which a set number of times of the continuous shooting can be repeated is displayed. In the screen in FIG. 4E, items of the continuous shooting time with which a set number of times of the continuous shooting can be repeated and other items are displayed in a distinguishable manner. In the example in FIG. 4E, the guide 403 indicates that the continuous shooting can be repeated ten times every two seconds when the time of one continuous shooting is not more than four seconds. Items of "one second", "two seconds", "three seconds", "four seconds", and "five seconds" are displayed in a color different from that of other items. As a result, the user can easily recognize the continuous shooting time for repeating the set number of times of the continuous shooting and can set the number of times of the continuous shooting, the continuous shooting time, and the standby time with high precision. For example, the number of times of the continuous shooting can be decreased or the standby time can be increased in order to increase the continuous shooting time to the desired time. As illustrated in FIG. 4D and FIG. 4E, another settable set value can be indicated on the basis of the set value of either one of the continuous shooting time and the standby time.

Figure 5:
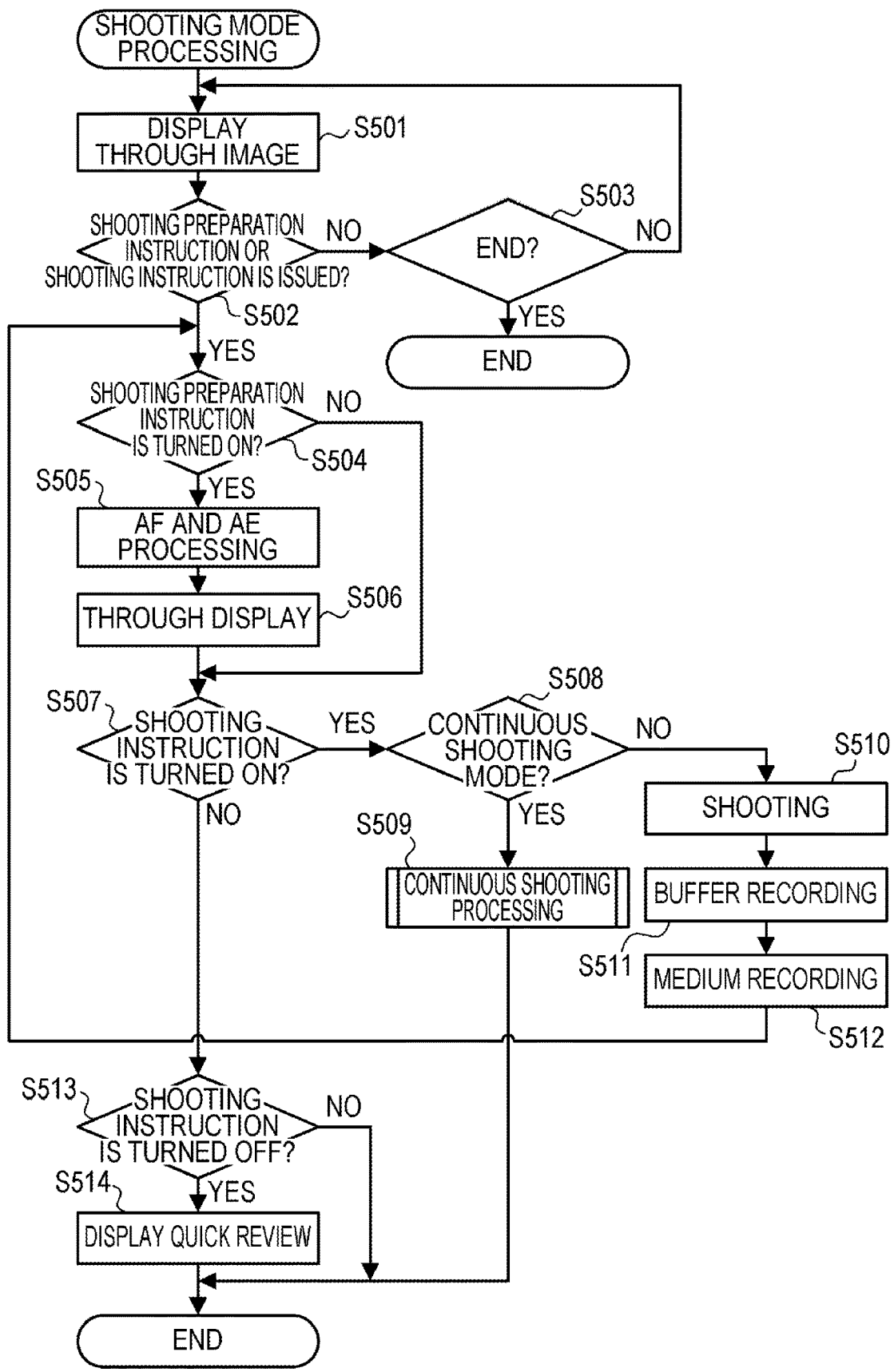
FIG. 5 is a flowchart illustrating an example of shooting mode processing according to this embodiment.

FIG. 5 is a flowchart relating to shooting mode processing of the digital camera 100. The processing in the flowchart in FIG. 5 is realized by extracting and executing the program stored in the nonvolatile memory 56 in the system memory 52 by the system control unit 50. The shooting mode processing illustrated in FIG. 5 is started when the shooting mode is set.

In Step S501, the system control unit 50 controls the display unit 28 to display a through image.

In Step S502, the system control unit 50 determines whether the shooting preparation instruction (turning ON the first shutter switch 62) or the shooting instruction (turning ON the second shutter switch 64) is issued. The shooting preparation instruction can be detected by monitoring the first shutter switch signal SW1 output from the first shutter switch 62 and the shooting instruction can be detected by monitoring the second shutter switch signal SW2 output from the second shutter switch 64. The processing proceeds to Step S504 when it is determined that the shooting preparation instruction or the shooting instruction is issued, and proceeds to Step S503 otherwise.

In Step S503, the system control unit 50 determines whether the shooting mode processing is to be ended. The shooting mode processing is ended in accordance with the removal of the setting of the shooting mode. The system control unit 50 ends the shooting mode processing when it is determined that the shooting mode processing is to be ended and returns to Step S501 otherwise.

In Step S504, the system control unit 50 determines whether the shooting preparation instruction is turned ON. The processing proceeds to Step S505 when it is determined that the shooting preparation instruction is turned ON, and proceeds to Step S507 otherwise. The shooting preparation instruction is issued by a half push on the shutter button 61 (SW1 ON).

In Step S505, the system control unit 50 controls the image processing unit 24 to perform AF processing and AE processing. In Step S506, the system control unit 50 controls the display unit 28 to display a through image. When a through image is already displayed, the displayed content is not changed.

In Step S507, the system control unit 50 determines whether the shooting instruction is turned ON. The processing proceeds to Step S508 when it is determined that the shooting instruction is turned ON, and proceeds to Step S513 otherwise. The shooting instruction is issued by a full push on the shutter button 61 (SW2 ON).

In Step S508, the system control unit 50 determines whether the continuous shooting mode is set. The processing proceeds to Step S509 when it is determined that continuous shooting mode is set, and proceeds to Step S510 otherwise. In Step S509, the system control unit 50 performs control so that the continuous shooting is performed (continuous shooting processing). Details of the continuous shooting processing are described below. In Step S510, the system control unit 50 performs control so that a series of processing from signal read out from the imaging unit 22 to the image processing by the image processing unit 24 is performed (imaging control; shooting). In Step S511, the system control unit 50 performs control so that the image data processed in Step S510 is recorded in the memory 32 (buffer recording). In Step S512, the system control unit 50 performs control so that the image data recorded in the memory 32 is written into the recording medium 200 (medium recording).

In Step S513, the system control unit 50 determines whether the shooting instruction is turned OFF after the shooting instruction is turned ON and the shooting processing is performed. The processing proceeds to Step S514 when it is determined that the shooting instruction is turned ON to OFF, and the system control unit 50 ends the shooting mode processing otherwise.

In Step S514, the system control unit 50 performs control so that the image data for display (quick review image) stored in the memory 32 is displayed on the display unit 28 for an image that is shot last. Then, the system control unit 50 ends the shooting mode processing.

Figure 6:
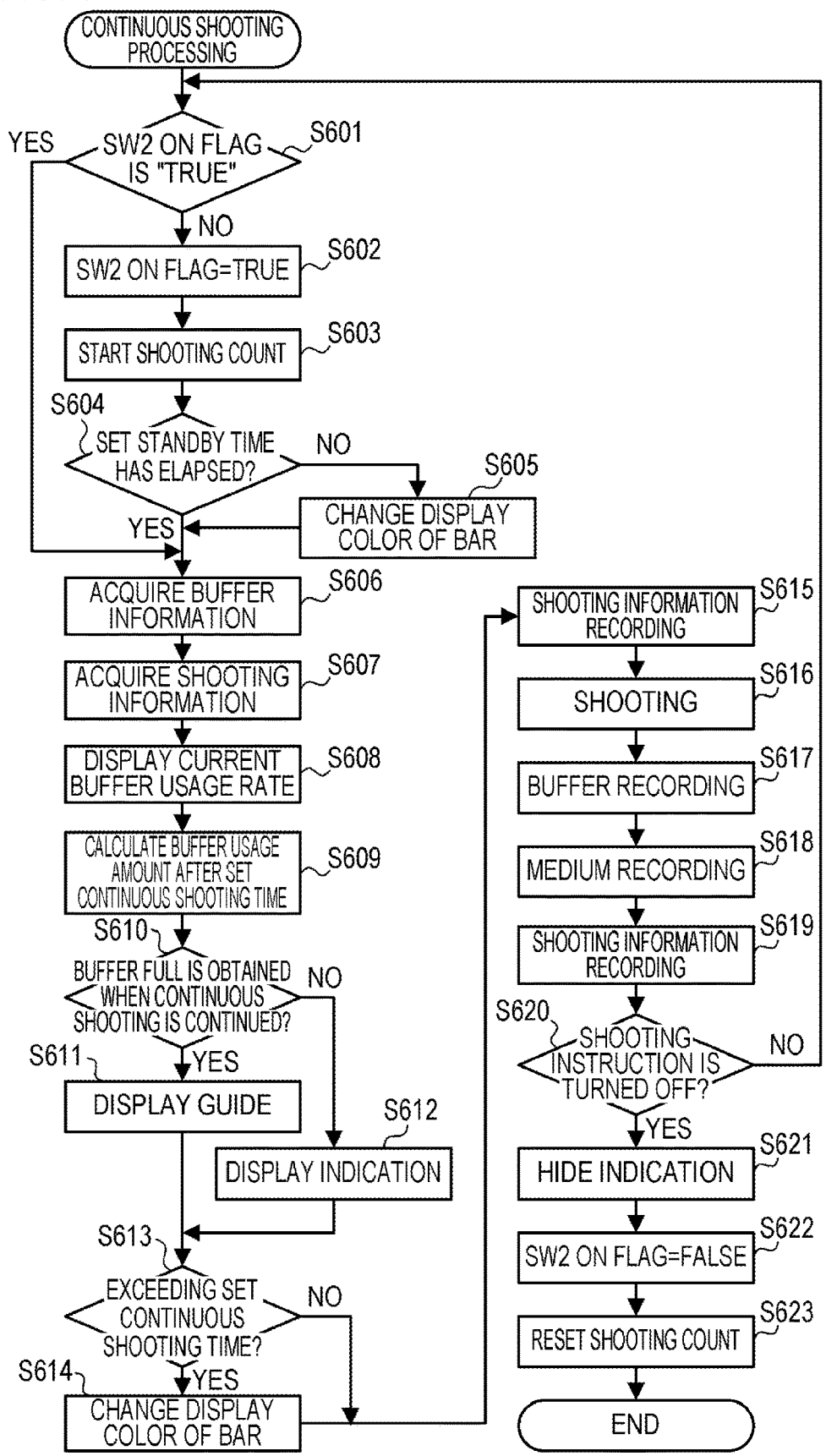
FIG. 6 is a flowchart illustrating an example of continuous shooting processing according to this embodiment.

FIG. 6 is a flowchart relating to the continuous shooting processing (S509) of the digital camera 100. In Step S601, the system control unit 50 determines whether a SW2 ON flag is "TRUE". The processing proceeds to Step S606 when it is determined that the SW2 ON flag is "TRUE", and proceeds to Step S602 otherwise. The SW2 ON flag is a flag for determining whether the continuous shooting is being performed (it is after the continuous shooting is started), "TRUE" means that the continuous shooting is being performed, and "FALSE" means that the continuous shooting is starting. The time (shooting time) in which the continuous shooting continues after the continuous shooting starts can be counted by using the SW2 ON flag.

In Step S602, the system control unit 50 sets the SW2 ON flag to "TRUE". In Step S603, the system control unit 50 starts to count the shooting time with use of the system timer 53.

In Step S604, the system control unit 50 determines whether the set standby time has elapsed from the last continuous shooting. The processing proceeds to Step S606 when it is determined that the set standby time has elapsed, and proceeds to Step S605 otherwise. In Step S605, the system control unit 50 performs control so that a predetermined notification is given (notification control). There is a fear that the desired number of times of continuous shooting cannot be repeated when the continuous shooting is started before the elapse of the set standby time. By the notification in Step S605, the user can easily recognize that the continuous shooting is not performed in accordance with the settings and the desired number of times (the number of times in accordance with the settings) or the desired time (set continuous shooting time) of continuous shooting cannot be performed, for example, and can suitably suspend the continuous shooting, for example. The details of the processing in Step S605 are described below.

In Step S606, the system control unit 50 acquires buffer information from the memory 32. The buffer information is information relating to a current usage rate (buffer usage rate) of the memory 32 and includes a buffer maximum capacity and a current buffer usage amount, for example. The buffer usage amount is a data amount of data recorded in the memory 32, and the buffer usage rate is a ratio of the buffer usage amount to the buffer maximum capacity.

In Step S607, the system control unit 50 acquires shooting information from the system memory 52. The shooting information includes initial shooting time, an initial buffer usage amount, previous shooting time, a previous buffer usage amount, and the like. The initial shooting time is shooting time at which the initial shooting in the current continuous shooting has been performed, and the initial buffer usage amount is a buffer usage amount in the initial shooting. The previous shooting time is shooting time at which the previous shooting in the current continuous shooting has been performed, and the previous buffer usage amount is a buffer usage amount in the previous shooting.

Figure 7A:
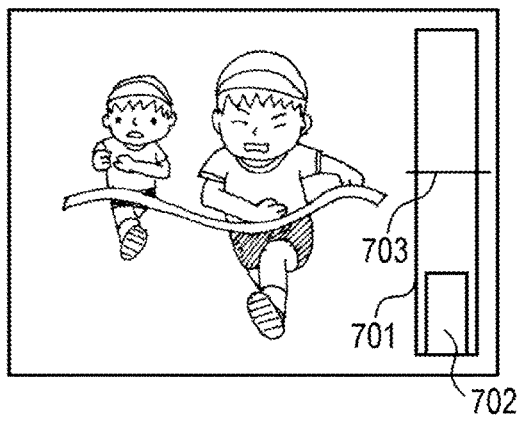
FIG. 7A to FIG. 7G are diagrams illustrating examples of screens displayed in the continuous shooting processing according to this embodiment.

In Step S608, the system control unit 50 performs control so that the current buffer usage rate is displayed on the display unit 28 (display control). FIG. 7A illustrates an example of a screen displaying the current buffer usage amount. A through image is displayed on the entire screen in each of FIG. 7A to FIG. 7G In each screen in FIG. 7A to FIG. 7G, a display frame 701, a bar 702, and an indication 703 are displayed. The bar 702 indicates the current buffer usage rate. When the upper end of the bar 702 is on the lower end of the display frame 701, that is, when the bar 702 is not displayed, the current buffer usage rate is 0%. When the upper end of the bar 702 is on the upper end of the display frame 701, the current buffer usage rate is 100%. The system control unit 50 calculates the current buffer usage rate with use of the buffer maximum capacity and the current buffer usage amount acquired in Step S606. In Step S605, a notification is realized by changing the display color of the bar 702 (current buffer usage rate). The indication 703 is displayed in Step S612 described below. The details of the indication 703 are described below.

In Step S609, the system control unit 50 calculates the buffer usage amount when the current continuous shooting is performed for the continuous shooting time on the basis of the current buffer usage amount and the set continuous shooting time. When the object or the shooting condition changes, the image size changes and the increasing and decreasing pace of the buffer usage amount also changes. When the shooting settings change, the image size and the image quality change and the increasing and decreasing pace of the buffer usage amount also changes. The writing speed on the recording medium 200 is not fixed, and hence the increasing and decreasing pace of the data stored in the memory 32 changes. Therefore, the buffer usage amount after the set continuous shooting time may change. Thus, in this embodiment, the data usage amount is calculated for every shooting. As a result, a highly-precise indication can be displayed.

FIG. 8 illustrates an example of a calculation method of the buffer usage amount after the set continuous shooting time. In FIG. 8, the horizontal axis indicates time and the vertical axis indicates the buffer usage amount. A point 801 corresponds to the initial shooting in the current continuous shooting. The initial shooting time acquired in Step S607 is time Tc1 and the initial buffer usage amount is a buffer usage amount Dc1. A point 802 corresponds to the second (previous) shooting in the current continuous shooting. The previous shooting time is time Tc2 and the previous buffer usage amount is a buffer usage amount Dc2. A point 803 corresponds to the current shooting. The current shooting time is time Tc3 and the current buffer usage amount acquired in Step S606 is a buffer usage amount Dc3. A point 804 corresponds to a timing after the set continuous shooting time. The shooting time that is the set continuous shooting time is time Tc4 and the buffer usage amount calculated in Step S609 is a buffer usage amount Dc4.

The buffer usage amount of the set continuous shooting time is calculated with use of Expression 1 below, for example, by the set continuous shooting time Tc4, the initial shooting time Tc1, the previous shooting time Tc2, the previous buffer usage amount Dc2, the current shooting time Tc3, and the current buffer usage amount Dc3.

$$Dc4=Dc3+(Dc3-Dc2)/(Tc3-Tc2)\times(Tc4-(Tc3-Tc1)) \quad \text{(Expression 1)}$$

The buffer usage amount after the continuous shooting time Tc4 can be calculated with use of Expression 2 below by the continuous shooting time Tc4, the initial shooting time Tc1, the initial buffer usage amount Dc1, the current shooting time Tc3, and the current buffer usage amount Dc3.

$$Dc4=Dc1+(Dc3-Dc1)/(Tc3-Tc1)\times Tc4 \quad \text{(Expression 2)}$$

In Step S610, the system control unit 50 determines whether the buffer usage amount Dc4 after the elapse of the set continuous shooting time Tc4 exceeds the buffer maximum capacity (the data amount Dmax in FIG. 3A and FIG. 3C). That is, the system control unit 50 determines whether the buffer full is obtained when the continuous shooting is performed for the continuous shooting time Tc4. In other words, the system control unit 50 determines whether the usage rate or the usage amount of the buffer that becomes buffer full when continuous shooting is performed again is reached. The usage rate and the usage amount of the buffer that becomes buffer full when continuous shooting is performed again may be calculated in advance when the settings of the continuous shooting are set and it may be determined whether the calculated value is reached in Step S610. The processing proceeds to Step S611 when it is determined that the buffer usage amount Dc4 after the continuous shooting time Tc4 exceeds the buffer maximum capacity Dmax (predetermined amount) and proceeds to Step S612 otherwise. That is, the processing proceeds to Step S611 when the buffer usage rate after the continuous shooting time Tc4 exceeds 100% (predetermined ratio) and proceeds to Step S612 otherwise. The predetermined amount is not limited to the buffer maximum capacity Dmax and the predetermined ratio is not limited to 100%.

Figure 7B:
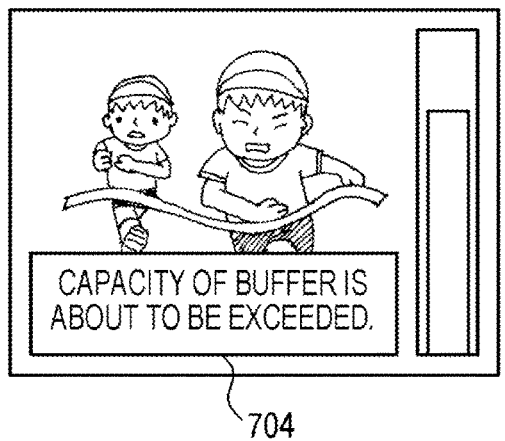

In Step S611, the system control unit 50 performs control so that a predetermined notification is given. Specifically, the system control unit 50 performs control so that a guide is displayed on the display unit 28. FIG. 7B illustrates an example of a screen displaying the guide. In the screen in FIG. 7B, a message 704 indicating that the set continuous shooting time Tc4 of the continuous shooting cannot be performed is displayed as a guide. As a result, the user can easily recognize that the continuous shooting time Tc4 of the continuous shooting cannot be performed, for example, and can suitably suspend the continuous shooting, for example. The guide may be an icon and the like.

In Step S612, the system control unit 50 performs control so that an indication (the indication 703 in FIG. 7A) indicating the buffer usage amount Dc4 after the set continuous shooting time Tc4, that is, the buffer usage rate after the continuous shooting time Tc4 is displayed on the display unit 28. The buffer usage rate after the continuous shooting time Tc4 is indicated by a display position (display height) of the indication 703. As a result, the user can easily recognize the buffer usage rate after the continuous shooting time Tc4 and can easily perform the continuous shooting for the continuous shooting time Tc4.

In Step S613, the system control unit 50 determines whether the current buffer usage amount Dc3 exceeds the buffer usage amount Dc4 after the set continuous shooting time Tc4. That is, the system control unit 50 determines whether the current shooting time Tc3 exceeds the continuous shooting time Tc4. The processing proceeds to Step S614 when it is determined that the current buffer usage amount Dc3 exceeds the buffer usage amount Dc4 after the continuous shooting time Tc4 and proceeds to Step S615 otherwise.

Figure 7C:
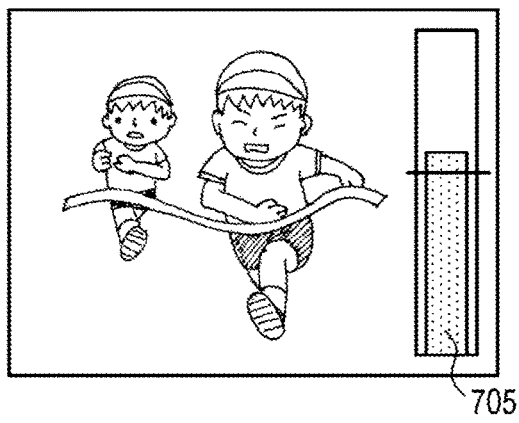

In Step S614, the system control unit 50 performs control so that a predetermined notification is given. Specifically, the system control unit 50 performs control so that the display color of the bar 702 (current buffer usage rate) in FIG. 7A is changed. FIG. 7C illustrates an example of a screen after the display color has changed. In FIG. 7C, the display color of a bar 705 (current buffer usage rate) is different from the display color of the bar 702 in FIG. 7A. Therefore, the user can easily recognize that the current shooting time Tc3 (the actual continuous shooting time) is exceeding the set continuous shooting time Tc4 and a desired number of times (the number of times in accordance with the settings) of the continuous shooting or the continuous shooting time Tc4 of the continuous shooting cannot be performed if the continuous shooting is continued any longer, for example. As a result, the user can suitably suspend continuous shooting.

In Step S615, the system control unit 50 records the current buffer usage amount Dc3 and the current shooting time Tc3 in the system memory 52 as shooting information. The current buffer usage amount Dc3 and the current shooting time Tc3 are acquired in the next shooting as a previous buffer usage amount and previous shooting time (S607).

In Step S616, the system control unit 50 performs control so that a series of processing from signal read out from the imaging unit 22 to the image processing by the image processing unit 24 (shooting) is performed. In Step S617, the system control unit 50 performs control so that the image data processed in Step S616 is recorded in the memory 32 (buffer recording). In Step S618, the system control unit 50 performs control so that the image data recorded in the memory 32 is written on the recording medium 200 (medium recording).

In Step S619, the system control unit 50 records the initial buffer usage amount and the initial shooting time into the system memory 52 as shooting information. When the current shooting is the initial shooting in the current continuous shooting, the current buffer usage amount Dc3 and the current shooting time Tc3 are recorded as an initial buffer usage amount and initial shooting time. When the system memory 52 already stores the initial buffer usage amount and the initial shooting time therein, the system control unit 50 may omit the processing in Step S619.

In Step S620, the system control unit 50 determines whether the shooting instruction is turned OFF. The processing proceeds to Step S621 when it is determined that the shooting instruction is turned OFF and returns to Step S601 otherwise. In Step S621, the system control unit 50 performs control so that the indication displayed on the display unit 28 is hidden. In Step S622, the system control unit 50 sets the SW2 ON flag to "FALSE". In Step S623, the system control unit 50 resets the count value of the current shooting time.

As described above, according to this embodiment (the continuous shooting processing in FIG. 6), the current buffer usage rate is displayed and an indication, a predetermined notification, and the like based on at least one of the set time (the continuous shooting time and the standby time) and the current buffer usage rate are displayed as appropriate. As a result, the user can easily recognize various information relating to the continuous shooting and a suitable continuous shooting becomes possible. For example, continuous shooting in accordance with the settings becomes possible and a case in which the continuous shooting is ended in an unintentional manner for the user can be suppressed.

In FIG. 7A and the like, an example in which the current buffer usage rate is displayed by a bar-graph-like indicator is illustrated, but the expression form of the current buffer usage rate is not particularly limited as long as the current buffer usage rate is recognizable. For example, the current buffer usage rate may be displayed by a pie-graph-like or tachometer-like indicator, a text (message), and the like.

The system control unit 50 may perform control so that the shooting is not performed when it is determined that the buffer usage amount Dc4 after the continuous shooting time Tc4 exceeds the buffer maximum capacity Dmax. As a result, the execution of shooting resulting in a failure can be suppressed, the processing load can be reduced, and the memory 32 can be efficiently used.

Figure 7D:
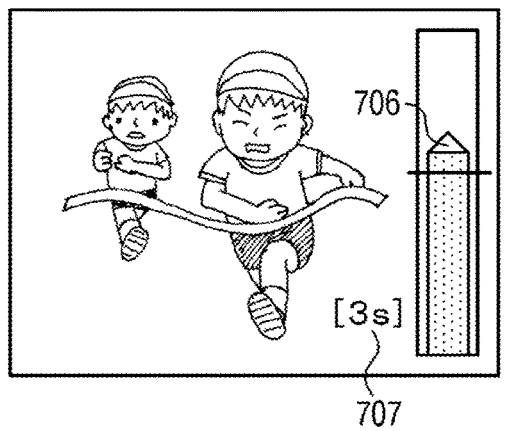

When the buffer usage rate is increasing, the system control unit 50 may perform control so that an indication indicating the increase is displayed. For example, the system control unit 50 may perform control so that an increase indication 706 in FIG. 7D is displayed. Similarly, when the buffer usage rate is decreasing, the system control unit 50 may perform control so that an indication indicating the decrease is displayed. As a result, the user can easily recognize the increase and decrease of the buffer usage rate.

The system control unit 50 may perform control so that an indication indicating the continuous shooting time Tc4 is displayed on the basis of the set continuous shooting time Tc4. For example, the system control unit 50 may perform control so that continuous shooting time information 707 in FIG. 7D is displayed. The continuous shooting time information 707 is a text indicating the continuous shooting time Tc4. Similarly, the system control unit 50 may perform control so that an indication indicating the standby time is displayed on the basis of the set standby time. As a result, the user can easily recognize the set continuous shooting time Tc4 and the standby time and can easily standby for the set continuous shooting time Tc4 of the continuous shooting and the set standby time.

The system control unit 50 may calculate the buffer usage amount when the current standby is performed for the standby time on the basis of the current buffer usage amount and the set standby time during the standby. Then, the system control unit 50 may perform control so that an indication indicating the buffer usage amount (buffer usage rate) after the set standby time is displayed. An indication 709 in FIG. 7E indicates the buffer usage rate after the set standby time. As a result, the user can easily recognize the buffer usage rate after the set standby time and can easily standby for the set standby time. Specifically, the user can start the next continuous shooting in accordance with the settings after waiting for the buffer usage rate to decrease to the position of the indication 709. Meanwhile, the user cannot perform a desired number of times (the number of times in accordance with the settings) of the continuous shooting when the continuous shooting is started before the buffer usage rate decreases to the position of the indication 709.

Figure 7E:
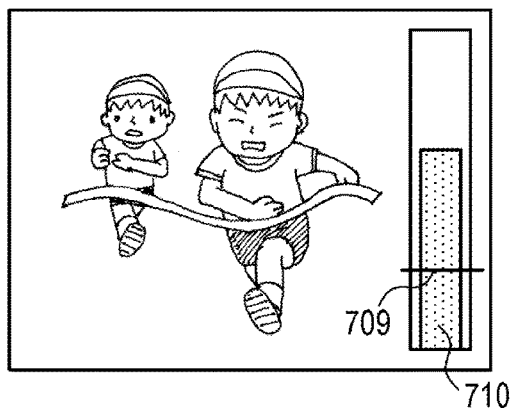

The system control unit 50 may perform control so that a predetermined notification is given when the current buffer usage rate exceeds the buffer usage rate (predetermined ratio) after the set standby time. In FIG. 7E, the upper end of a bar 710 (current buffer usage rate) is above the indication 709 and the current buffer usage rate exceeds the buffer usage rate after the set standby time. Therefore, the bar 710 is displayed in a display color different from the display color of the bar 702 in FIG. 7A. As a result, the user can easily recognize whether the buffer usage rate has decreased to the buffer usage rate after the set standby time, that is, whether the standby time has elapsed, and can standby for the set standby time in an easier manner.

Figure 7F:
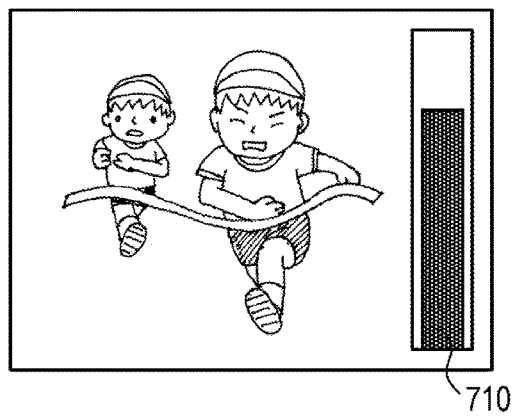

As predetermined notifications, an example in which a notification is given by a display color and a notification is given by displaying an image (guide) is described, but the method of giving a notification is not particularly limited thereto. For example, a notification may be given by a display pattern, a blinking display, a sound, and the like. As illustrated in FIG. 7F, the system control unit 50 may perform control so that the bar 710 (current buffer usage rate) in a display color different from the display color of the bar 702 in FIG. 7A is displayed instead of the guide 704. In addition, the system control unit 50 may perform control so that the display color is changed in accordance with the notification content. The display color of the bar 710 in FIG. 7F is also different from the display color of the bar 705 in FIG. 7C.

The system control unit 50 may perform control so that an indication indicating the executable number of times of the continuous shooting before the buffer usage rate reaches 100% is displayed on the basis of the current buffer usage rate, the set continuous shooting time, and the standby time.

First, the system control unit 50 calculates an average buffer increase amount (an increase amount of the buffer usage rate) in the set continuous shooting time on the basis of a plurality of times of continuous shooting performed in the past. The buffer increase amount can be calculated with use of Expression 3 below. Similarly, the system control unit 50 calculates an average buffer decrease amount (a decrease amount of the buffer usage rate) in the set standby time on the basis of a plurality of times of the standby performed in the past. Then, the system control unit 50 calculates the executable number of times of the continuous shooting before the buffer usage rate reaches 100% on the basis of the calculated buffer decrease amount and buffer increase amount and performs control so that the calculated number of times is displayed.

(Buffer increase amount)=(Buffer usage amount when continuous shooting is ended)−(Buffer usage amount when the continuous shooting is started)    (Expression 3)

Figure 7G:
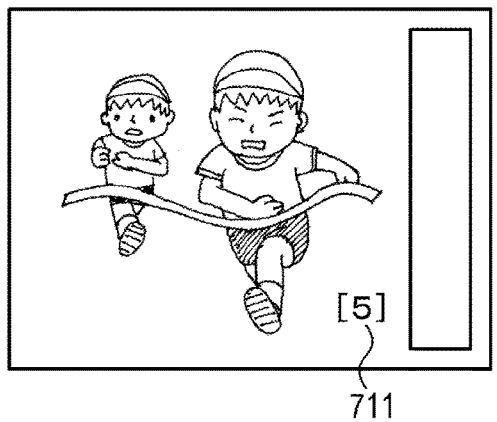

FIG. 7G illustrates an example of a screen displaying the executable number of times of the continuous shooting. An indication 711 indicates the executable number of times of the continuous shooting. Specifically, the indication 711 indicates that the continuous shooting can be performed five times when the set continuous shooting time of continuous shooting and the set standby time of standby are repeated. The system control unit 50 may perform control so that an indication indicating the executable number of times of the continuous shooting is displayed only when the current buffer usage rate is 0%.

The expression form of the indication is not particularly limited as long as the meaning of the indication is recognizable. For example, a text indicating the buffer usage rate may be displayed as an indication. The system control unit 50 may perform control so that the remaining time before the next continuous shooting starts in accordance with the settings, the remaining time before the continuous shooting ends in accordance with the settings, the remaining number of times of the continuous shooting before the number of times in accordance with the settings is reached, or the like is displayed in a countdown form. The system control unit 50 may perform control so that the indication is not displayed when the current buffer usage amount is 100%, that is, buffer full.

An example in which both the continuous shooting time and the standby time are set is described, but a case in which only one of the continuous shooting time and the standby time is set is possible. For example, the screens in FIG. 7B, FIG. 7C, FIG. 7D, FIG. 7F, and the like can be displayed without using the set standby time. Therefore, the standby time does not necessarily need to be set when only the screens in FIG. 7B, FIG. 7C, FIG. 7D, FIG. 7F, and the like are displayed as screens for displaying indications and giving other notifications. The screens in FIG. 7E and the like can be displayed without using the set continuous shooting time. Therefore, the continuous shooting time does not necessarily need to be set when only the screens in FIG. 7E and the like are displayed as screens for displaying indications and giving other notifications.

Time different from time designated by the user may be set as the continuous shooting time and the standby time. For example, when an item "AUTO" (FIG. 4A) of the continuous shooting time is designated, the system control unit 50 may set the average time of a plurality of times of continuous shooting performed in the past or the time of an immediately-preceding continuous shooting as the continuous shooting time. When an item "AUTO" (FIG. 4B) of the standby time is designated, the system control unit 50 may set the average time of a plurality of times of standby performed in the past or the time of an immediately-preceding standby as the continuous shooting time.

The system control unit 50 may perform control so that an indication indicating a buffer usage rate obtained by subtracting the increase amount of the buffer usage rate due to the set continuous shooting time of continuous shooting from 100% is displayed on the basis of the continuous shooting time. As a result, the user can easily recognize whether the buffer usage rate reaches 100% due to the set continuous shooting time of continuous shooting, that is, whether the set continuous shooting time of continuous shooting can be performed and can suitably suspend the continuous shooting.

Figure 9A:
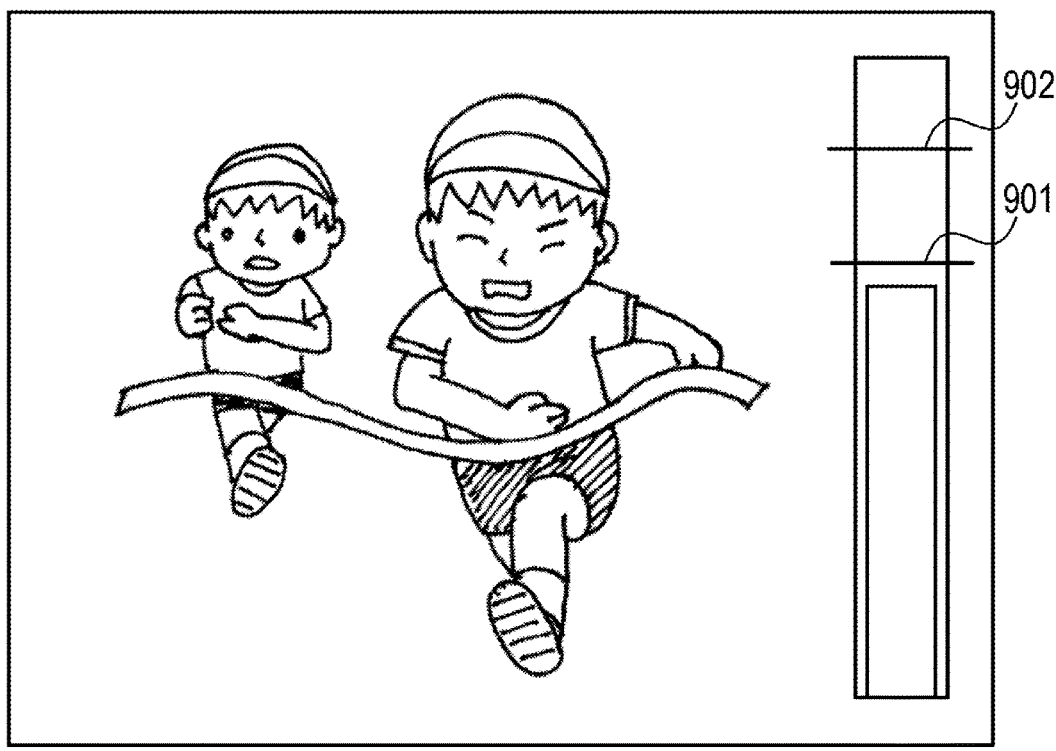
FIG. 9A and FIG. 9B are diagrams illustrating examples of screens displayed in the continuous shooting processing according to this embodiment.
Figure 9B:
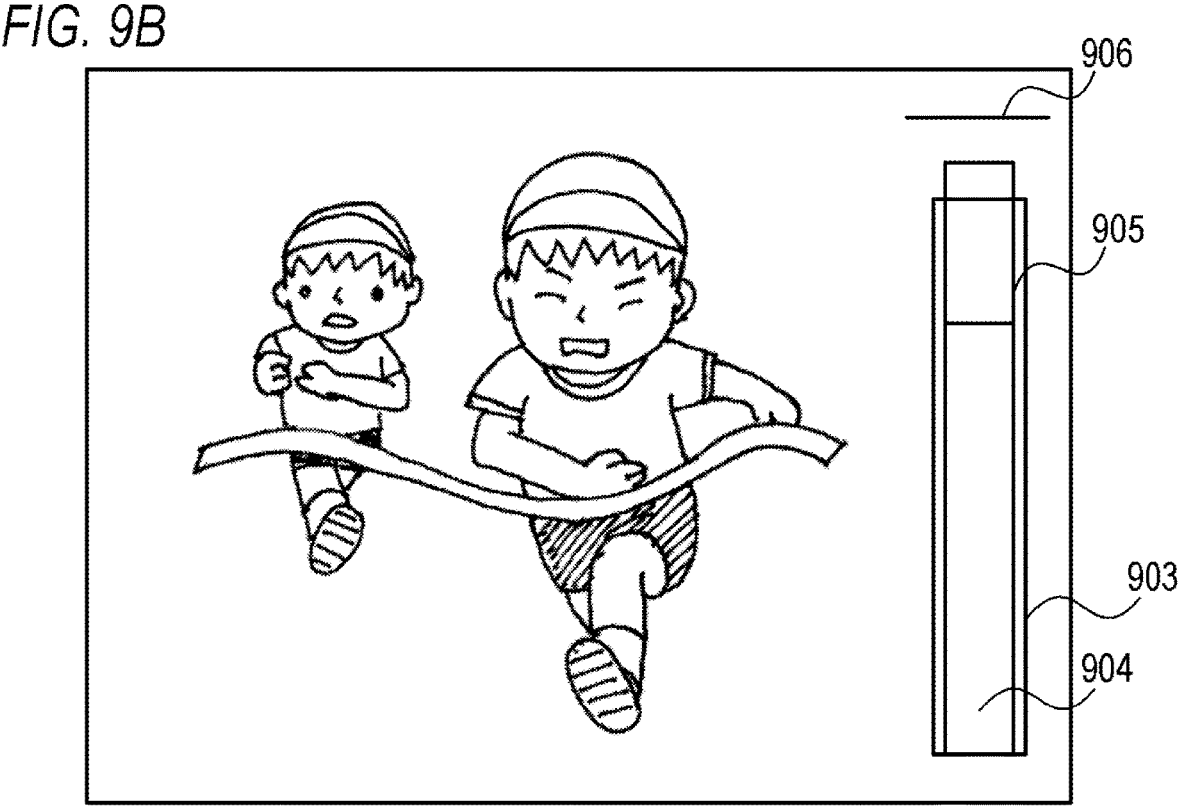

The system control unit 50 may perform control so that indications as in FIG. 9A and FIG. 9B is displayed. In the screen in FIG. 9A, an indication 901 indicating a maximum value of the buffer usage rate with which the buffer usage rate becomes 0% due to the set standby time of standby is displayed. The system control unit 50 performs control so that the indication 901 is displayed on the basis of the set standby time. As a result, the user can easily recognize whether the buffer usage rate becomes 0% due to the set standby time of standby and can suitably perform continuous shooting and standby. For example, the user can easily recognize that the buffer usage rate becomes 0% due to the set standby time of standby if the continuous shooting is suspended at a buffer usage rate up to the buffer usage rate of the indication 901.

In the screen in FIG. 9A, an indication 902 indicating a minimum value of the buffer usage rate with which the buffer usage rate exceeds 100% due to a set continuous shooting time of continuous shooting even if the set standby time of standby is performed is displayed. The system control unit 50 controls the indication 902 to be displayed on the basis of the set continuous shooting time and standby time. As a result, the user can easily recognize whether the buffer usage rate exceeds 100% due to the set continuous shooting time of continuous shooting even if the set standby time of standby is performed and can suitably perform continuous shooting and standby. For example, the user can easily recognize that the set continuous shooting time of the continuous shooting can be performed again after the set standby time of standby if the continuous shooting is suspended at a buffer usage rate up to the buffer usage rate of the indication 902. In addition, the user can easily recognize that the set continuous shooting time of continuous shooting results in buffer full even when standby is performed for the set standby time if the continuous shooting is suspended at a buffer usage rate exceeding the buffer usage rate of the indication 902.

In the screen in FIG. 9B, a display frame 903 indicating a range of the buffer usage rate and a bar 904 indicating the current buffer usage rate are displayed. In addition, in the screen in FIG. 9B, an indication 905 indicating the increase amount of the buffer usage rate due to the set continuous shooting time of continuous shooting is displayed. The system control unit 50 performs control so that the indication 905 is displayed on the basis of the set continuous shooting time. The indication 905 is a bar and is displayed so that the lower end of the indication 905 is fixed to the upper end of the bar 904. As a result, the user can easily recognize the increase amount of the buffer usage amount due to the set continuous shooting time of continuous shooting and can suitably perform continuous shooting and standby. For example, the user can easily adjust the time of the continuous shooting and the standby so that the buffer full is avoided.

In the screen in FIG. 9B, an indication 906 indicating the decrease amount of the buffer usage rate due to the set standby time of standby is displayed. The system control unit 50 performs control so that the indication 906 is displayed on the basis of the set standby time. The distance from the upper end of the display frame 903 to the indication 906 corresponds to the decrease amount of the buffer usage rate due to the set standby time of standby. As a result, the user can easily recognize the decrease amount of the buffer usage amount due to the set standby time of standby and can suitably perform continuous shooting and standby. For example, when the upper end of the indication 905 is in the position of the indication 906, the upper end of the indication 905 drops to the upper end of the display frame 903 due to the set standby time of standby. Therefore, the user can easily recognize that the set continuous shooting time of continuous shooting after the set standby time of standby does not result in buffer full by checking that the upper end of the indication 905 is in the position of the indication 906 or below the position. Meanwhile, when the upper end of the indication 905 is above the indication 906, the upper end of the indication 905 does not drop to the upper end of the display frame 903 even if the set standby time of standby is performed. Therefore, the user can easily recognize that the set continuous shooting time of continuous shooting after the set standby time of standby results in buffer full by checking that the upper end of the indication 905 is above the position of the indication 906.

During the standby time after the continuous shooting, a warning may be displayed during the standby time and how many seconds the standby at least should be performed may be indicated when shooting for the set continuous shooting time results in buffer full even after the set standby time.

The various controls described to be performed by the system control unit 50 above may be performed by one hardware or the entire apparatus maybe controlled by allocating the processing to a plurality of hardware.

The present invention has been described in detail on the basis of exemplary embodiments thereof, but the present invention is not limited to those particular embodiments and various forms that do not depart from the gist of the present invention are included in the present invention. Each embodiment described above is merely an embodiment of the present invention and the embodiments may be combined as appropriate.

In the embodiments described above, an example in which the present invention is applied to a digital camera is described, but the present invention is not limited to the example and can be applied to any apparatus as long as the apparatus is an imaging control apparatus that can control the continuous shooting. That is, the present invention is applicable to a personal computer, a PDA, a mobile phone terminal, a portable image viewer, a printer apparatus including a display, a digital picture frame, a portable audio player, a gaming machine, an e-book reader, a tablet terminal, a smartphone, a projector, and a household electrical appliance and an on-board apparatus including a display.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-204170, filed on Oct. 23, 2017, which is hereby incorporated by reference herein in its entirety.

What is claimed is:

1. An imaging control apparatus, comprising:
an imaging control unit configured to perform control so that continuous shooting in which a plurality of images is continuously shot is performed;
a temporary storage unit configured to temporarily store image data acquired by the continuous shooting into a first memory;
a recording unit configured to record the image data stored in the first memory into a second memory;
at least one processor configured to execute a program stored in a memory to function as a setting unit configured to set a predetermined shooting setting relating to a standby time from end of the continuous shooting to start of a next continuous shooting; and
a display control unit configured to perform control so that information indicating a storage state of data in the first memory is displayed on a display unit,
wherein the display control unit performs control so that an indication relating to the storage state of the data in the first memory from after the continuous shooting ends to after the standby time is displayed during standby after the continuous shooting together with the information.

2. The imaging control apparatus according to claim 1, wherein the display control unit performs control so that information indicating a ratio of a data amount stored in the first memory to a data amount storable in the first memory in the continuous shooting is displayed.

3. The imaging control apparatus according to claim 1, wherein the display control unit performs control so that a usage rate of the first memory capable of temporarily storing image data in the continuous shooting is displayed.

4. The imaging control apparatus according to claim 1, wherein:
the predetermined shooting setting is continuous shooting time of the continuous shooting; and
the display control unit performs control so that an indication indicating a storage state of the data in the first memory in a case where shooting is performed for the continuous shooting time is displayed.

5. The imaging control apparatus according to claim 4, wherein the display control unit changes a display form of the information in response to time of the continuous shooting exceeding the continuous shooting time.

6. The imaging control apparatus according to claim 1, wherein the display control unit hides the indication in response to end of the continuous shooting.

7. The imaging control apparatus according to claim 1, wherein the display control unit performs control so that the predetermined shooting setting is displayed together with the information and the indication.

8. The imaging control apparatus according to claim 3, wherein the display control unit displays, together with the information, a display item indicating that the usage rate of the first memory has increased or a display item indicating that the usage rate of the first memory has decreased.

9. An imaging control method, comprising:
performing control so that continuous shooting in which a plurality of images are continuously shot is performed;
temporarily storing image data acquired by the continuous shooting into a first memory;
recording the image data stored in the first memory into a second memory;
setting a predetermined shooting setting relating to a standby time from end of the continuous shooting to start of a next continuous shooting; and
performing control so that information indicating a storage state of data in the first memory is displayed on a display unit,
wherein control is performed so that an indication relating to the storage state of the data in the first memory from after the continuous shooting ends to after the standby time is displayed during standby after the continuous shooting together with the information.

10. A non-transitory computer readable medium that stores a program, wherein the program causes a computer to execute:
performing control so that continuous shooting in which a plurality of images are continuously shot is performed;
temporarily storing image data acquired by the continuous shooting into a first memory;
recording the image data stored in the first memory into a second memory;
setting a predetermined shooting setting relating to a standby time from end of the continuous shooting to start of a next continuous shooting; and
performing control so that information indicating a storage state of data in the first memory is displayed on a display unit,
wherein control is performed so that an indication relating to the storage state of the data in the first memory from after the continuous shooting ends to after the standby time is displayed during standby after the continuous shooting together with the information.

* * * * *

UNITED STATES PATENT AND TRADEMARK OFFICE
CERTIFICATE OF CORRECTION

PATENT NO.        : 10,666,850 B2                                              Page 1 of 1
APPLICATION NO.   : 16/162872
DATED             : May 26, 2020
INVENTOR(S)       : Toshiaki Ueguri It is certified that error appears in the above-identified patent and that said Letters Patent is hereby corrected as shown below:

On the Title Page

Item (30) "Foreign Application Priority Data" should read as follows:
Oct. 23, 2017 (JP)............................... 2017-204170

Signed and Sealed this
Eleventh Day of August, 2020

Andrei Iancu
*Director of the United States Patent and Trademark Office*